United States Patent [19]
Kharazipour et al.

[11] Patent Number: 5,505,772
[45] Date of Patent: Apr. 9, 1996

[54] PROCESS FOR CONGLUTINATING WOOD PARTICLES INTO FORMED BODIES

[75] Inventors: Alireza Kharazipour; Aloys Hüttermann, both of Göttingen; Gerhard Kühne, Dresden; Martin Rong, Neumarkt/Opf., all of Germany

[73] Assignee: Pfleiderer Unternehmensverwaltgung GmbH & Co., KG, Neimarkt/Opf., Germany

[21] Appl. No.: 44,532

[22] Filed: Apr. 8, 1993

[30] Foreign Application Priority Data

Apr. 9, 1992 [DE] Germany ............ 42 11 981.2
Feb. 22, 1993 [DE] Germany ............ 43 05 411.0

[51] Int. Cl.$^6$ ............................................. C09D 101/02
[52] U.S. Cl. ............................................. 106/163.1
[58] Field of Search ............................... 106/163.1

[56] References Cited

U.S. PATENT DOCUMENTS 4,496,718  1/1985  Rudy ........................... 536/56

FOREIGN PATENT DOCUMENTS 3037992  8/1982  Germany.
271079   8/1989  Germany.
7967562  5/1976  U.S.S.R..

OTHER PUBLICATIONS

ISSN 0368–8798; Nr. 168: (Oct. 1991) 1st European Workshop On Lignocellulosics Ans Pulp (EWLP) Proceedings, pp. 103–115.
Haruhiko et al., "Applications of Phenol Dehydrogenative Polymerization," Journal of Japanese Wood Research, vol. 38, pp. 931–937 (1992) no month available (Abstract).
Haruhiko et al., "Applications of Dehydrogenative Polymerization of Vanillic Acid," Journal of Japanese Wood Research, vol. 37, pp. 220–226 (1991) no month avaialble.
Kazumasa, S. "Stream Explosion Treatment of Wood," Japan APPI Journal, vol. 42, pp. 1114–1130 (1988) no month available Abstract).
Abstract Bulletin of the Institute of Paper Science And Technology (Nov. 1990) Wagenfuhr, "Enzymatic Chip Modification," (Abstract No. 4886).

*Primary Examiner*—David Brunsman
*Attorney, Agent, or Firm*—Meltzer, Lippe, Goldstein

[57] ABSTRACT

A process for conglutinating wood fragments wherein the wood has middle lamella lignin, comprises incubating the wood fragments in an incubation mixture containing a phenol oxidizing enzyme thereby activating the middle lamella lignin. This makes it possible to produce formed bodies such as fiber boards, for example, without chemical disintegration and without addition of binders.

17 Claims, No Drawings

PROCESS FOR CONGLUTINATING WOOD PARTICLES INTO FORMED BODIES

BACKGROUND OF THE INVENTION

The instant invention relates to a process for conglutinating (i.e., gluing together) wood particles into formed bodies, and to the binder-free formed bodies produced by the process, in particular, board-shaped material.

Particle boards and wood fiber boards are valuable materials which can be made of a self-regenerating raw material, i.e., materials such as lignocellulose-containing wood. These wood materials are used in many different areas of manufacture as the basic material. Mainly the furniture industry, the automotive industry, the packing industry, the construction industry, etc., are involved here. Heretofore, particle boards and wood fiber boards were generally mixed with binders, were formed, and then pressed under heat and pressure. So-called medium-density fiber (MDF) wood fiber boards are normally made of wood chips from needle or leaf bearing trees produced in chippers, e.g., the chips are reduced by means of so-called refiners to the desired fiber size and fiber thickness. The wood fibers are normally glued or conglutinated with synthetic resins and are dried to a desired degree wood fiber humidity. The binder-coated wood fibers are then deposited by machine in a forming station on a conveyor belt (MDF boards), or are deposited on a sieving belt.

Depending on the desired range of apparent density, insulating boards (230 to 400 kg/m$^3$ apparent density), medium-hard wood fiber boards (350 to 800 kg/m$^3$ apparent density), as well as MDF boards (approximately 650 to 900 kg/m$^3$ apparent density), and also hard fiber boards (approximately 800 to 1,200 kg/m$^3$), are produced.

Compression into the board-shaped materials can be carried out in a discontinuous operation as well as in continuous operation presses, the so-called pass-through or conti-machines.

In addition to these board-shaped materials, processes using fibers prepared in this manner are also known in which a two-phase or multi-phase pressing process makes it possible to produce so-called "fiber form elements." The fiber form elements are normally pre-pressed into a blank in a first pressing process, wherein the essential hardening reaction is not completed, i.e., is at first only a partial one.

The "mats" which are thus obtained, and which may furthermore contain additional web/fabric inserts, are already sufficiently firm after the first pressing process to be handled and are brought to their final form in a second pressing process. This can be achieved by means of an appropriate pressing tool which reflects the form of the finished product and imparts it to the product.

MDF as well as wood fiber and particle boards are normally conglutinated with binders, e.g., uric formaldehyde resins, melamine formaldehyde resins, phenol formaldehyde resins, and/or diisocyanates as the binding components. The quantity of the binder generally amounts to approximately 3 to 15% of the weight of the wood fiber or wood chip quantity (abs. dry). The quantity of binder depends in this case among other factors on the type of binder and on the type of wood fiber or wood chip, as well as on the mechanical and technical properties of the raw wood materials.

In addition to binders based on synthetic materials, biologically-based binders have also proven themselves. According to DE 30 37 992 C2, the lignin sulfonate obtained in cellulose production is mixed with enzymes obtained through biotechnological means and is mixed into the wood fibers or wood chips as a binder. The enzymatic catalysis then causes the "hardening" of the lignin phase, so that the wood fibers or chips conglutinated into the binder solidify. This system consisting of binder and enzyme can practically be viewed as a "biological two-component adhesive" in which the lignin sulfonate could be the adhesive component and the enzyme the hardener. This process requires the utilization of lignin sulfonate as the binder in the process for the production of the formed body, in particular of board-shaped material.

An operating procedure in the production of low-emission binders for work materials containing wood or cellulose is described in DE 36 44 397. It is a disadvantage of this process that it is still necessary to use a binder based on synthetic resin which, together with the lignin and lignin-like waste materials, such as sulfite waste liquor, must be mixed with the lignocellulose-containing material before pressing.

The object of the present invention is to provide a process which can be used without the addition of a binder, but merely through the action of an enzyme upon a lignin which has not been chemically pre-treated to produce formed bodies, in particular board-shaped basic material of comminuted wood particles which can be processed at least in part in conventional plants or plant sections such as described earlier in the state of the art. It is also the object of the instant invention to create formed bodies, in particular board-shaped materials, from lignocellulose-containing materials and containing no additional binders.

SUMMARY OF THE INVENTION

In accordance with the present invention, a process for conglutinating wood fragments having middle lamella lignin comprises incubating the wood fragments in an incubation mixture containing a phenol oxidizing enzyme thereby activating the middle lamella lignin.

DETAILED DESCRIPTION OF THE INVENTION

In comminuting wood, in particular in defibration, the wood particles are preferably split along the middle-lamellas containing the greatest part of lignin. Since a great expenditure of energy is necessary in the defibration of wood, leading to a heating of the particles to be comminuted, to a point above the vitrification of lignin, it may occur, especially in mechanical defibration, that the lignin changes into a glass-like structure at its surface. When defibration is effected by a steam process, less of this glass phase formation is noted. The slow-reactive glass phase is often quite impervious to chemical reactions and this also applies to enzyme reactions.

Surprisingly the middle-lamella lignin of the wood, even when it is found in the glass-like structure, can be activated by phenol-oxidizing enzymes to the point where it leads to polymerization and therefore to conglutination of the wood particles.

The phenol-oxidizing enzymes used in the process according to the invention are able to react in an enzymatic reaction with the middle-lamella lignin. The raw material consisting of mechanically comminuted wood particles or fibers is then formed into formed bodies under the action of thermal, mechanical or thermo-mechanical processes.

Chips and/or fibers from wood or wood-like materials serve as the basic material for the process according to the invention. Materials similar to wood with a lignin content, in particular containing middle-lamella lignin which are accessible to the action of phenol-oxidizing enzymes, e.g., wood chips, wood fibers, flax, flax shavings, jute, coconut fibers, etc., are also considered to be wood-like materials in the sense of this definition.

The basic materials are comminuted or defibrated in a known manner, e.g., by mechanical processes such as refiner or steam-comminution processes, or steam explosion processes according to Mason. Refining installations are obtainable commercially and are supplied, for example, by the Defibrator Company in Sweden, or by Andritz Sprout Bauer Co., USA. In the steam explosion process, the basic material is heated by steam under pressure and is suddenly decompressed.

In a preferred embodiment of the process according to the invention, the enzymes which are able to react enzymatically with the lignin are brought into contact with the comminuted basic material in dissolved form. This can be carried out by such means as, e.g., spraying, dipping or soaking the basic material with or in the enzyme-containing solution.

Oxidases are preferably used as the enzymes, in particular, polyphenol oxidases (laccases), tyrosinases, peroxidases, etc. Such enzymes are advantageously used as described in DE 30 37 992 C2, DE 36 44 397 C1 or DE 40 33 246. These are phenol-oxidizing enzymes from, e.g., cultures of white rot fungi which together with the aromatic residues of the lignin, possibly also of the hemicellulose, can produce reactive groups in the lignin or hemicellulose molecule in a kind of radical phenol-oxidation reaction, whereby these groups then polymerize and/or cross-link in secondary reactions.

The enzyme-containing solution can also contain auxiliary elements such as inducers, emulsifying agents, effectors and/or other enzymes carrying out supporting functions. The incubation of the enzymes with the solubilized lignocellulose-containing raw materials should preferably last for two hours. If necessary, the incubation period can be optimized by varying certain parameters such as pH value, temperature, ionic strength, etc. The enzymatic reaction can also be terminated by adding enzyme inhibitors, by thermal or chemical denaturing of the enzymes, or by removing the enzyme solution through filtration, etc.

An upper limit of the incubation period is non-critical. The lignocellulose-containing raw materials can therefore be incubated without difficulty for up to 170 hours with the enzyme solutions. Therefore it is also possible to incubate the solubilized lignocellulose-containing raw materials for longer periods of time with enzymes during transportation.

The minimum incubation period of 2 hours indicated above applies to the systems or enzyme concentrations which are easily obtainable today. With concentrated or more effective enzyme systems it is also possible to shorten these incubation periods.

In general, it has been found that the enzymes used for incubation should show certain minimum activities. Preferably these activities range from 50 U/ml to several times 10,000 U/ml, preferably 500 to 2,000 U/ml. The determination of activity is photometric at 468 nm by means of a reference substance according to the Kharazipour dissertation, 1983, University of Goettingen. In case of high enzyme activities it is recommended to use correspondingly dilute solutions.

According to the process of the invention, board-shaped formed bodies can be produced according to the wet, the dry or the half-dry process. In the dry process, the residual humidity of the solubilized lignocellulose-containing raw material is less than 20% humidity by weight. Half-dry lignocellulose-containing raw materials are understood to have a residual humidity of 20 to 35 % by weight, and wet lignocellulose-containing raw materials are understood to have up to 120% humidity by weight as related to the lignocellulose content abs. dry.

Water removal can be effected by suction or by pressing the water off. It is also possible to dry the incubated, solubilized lignocellulose-containing raw materials by drying them at 30° to 200° C., preferably at 50° to 100° C., to the desired residual humidity abs. dry of lignocellulose-containing raw materials. When MDF wood fiber boards are made, the raw material can be dried to a residual humidity below 10%, preferably approximately 3%, and can then be incubated for, e.g., 1.5 to 3 days.

The enzymatically treated material is preferably formed into a mat-like pre-product, is then pre-compressed and then given the desired shape, and then pressed under pressure and possibly with the addition of heat. The formed bodies thus obtained are free of binders and have outstanding characteristics of resistance to swelling as well as mechanical characteristics such as excellent transversal traction resistance and resistance to bending.

It has been shown that when the basic materials are treated with the enzyme solution, an enrichment in certain phenolic materials originating in lignin molecules, e.g., carbohydrates, takes place in said enzyme solution. This makes it possible to make certain assumptions concerning the manner in which the enzyme incubation is carried out and which can be utilized within the framework of automatic process control of incubation conditions.

The binder-free formed bodies, in particular, board-shaped work materials which can be obtained through the process according to the invention can be pre-formed in any desired mold, to be then processed with appropriate pressing devices in a known manner, e.g., into fiber boards or particle boards or other wood fiber boards such as medium-density fiber boards, insulating fiber and wood fiber boards, chip boards, formed elements for the packing, automotive or construction industries, etc.

It has been shown that the raw material mass treated with enzymes remains stable for a long time, and can therefore be stored. This offers the possibility of starting this mass through comminution of the raw material and incubation with the appropriate enzymes, and storing it in tanks to be brought later to the forming processes. This mass thus represents an intermediate product in the course of production of the formed bodies according to the invention.

The binder-free formed bodies according to the invention satisfy in a truly ideal manner economic requirements as well as environmental requirements for the manufacture of such products as wood materials. Thanks to the abandonment of binders, the formed bodies, in particular wood materials in the form of particle boards, insulation fiber or wood fiber boards or medium-density fiber boards are absolutely compatible with the environment as they contain merely the raw material wood in a modified form and in a kind of reorganized form as a result of the enzyme treatment. By abandoning even low-emission binders as described in the earlier-mentioned patent documents, it is possible to reduce production costs.

The invention shall be described in greater detail below through the following examples.

EXAMPLE 1

Production of a formed body free of binders from wood.

500 g of wood fibers produced (defibrated) in a refiner, with a fiber humidity of approximately 50% were submerged in a phenol oxidase enzyme solution consisting of laccase (E.C.1.10.3.2.) of 860 U/ml. The temperature was 25° C. Following an incubation period of 7 days the incubated fiber material which still contained approximately 100% in residual humidity (abs. dry wood fiber) was strewn on a sieve, formed into a fiber mat, compressed and pressed at 180° C. into a wood fiber board. The pressing time was 8 minutes. The thickness of the boards was 4.5 mm.

After pressing the fiber boards were cooled.

EXAMPLE 2 (comparison)

As a comparison with Example 1, 500 g of defibrated wood fiber with a wood fiber humidity of approximately 50% was immersed in normal water. The temperature was 25° C. After an incubation period of 7 days the fiber material immersed in water and still containing approximately 100% residual humidity (abs. dry wood fiber) was pressed as described in Example 1. The thickness of the board was 4.8 mm.

QZ Transversal resistance to traction

LZ Longitudinal resistance to traction

BF Resistance to bending

Swelling, as defined in DIN standards 68761 and 68763.

TABLE 1

| Measured value | Example 1 | Example 2 (comparison) |
| --- | --- | --- |
| Thickness in mm | 4.3 | 4.8 |
| QZ (N/mm$^2$) | 0.43 | 0.03 |
| LZ (N/mm$^2$) | 16.76 | 7.21 |
| BF (N/mm$^2$) | 36.2 | 14.9 |
| Swelling % | 34.0 | 151 |
| Density (kg/m$^3$) | 986.0 | 919 |

EXAMPLE 3

Production of an MDF board in a dry process

Defibrated wood fibers were dried to a wood humidity of 3.0% abs. dry at 130° C. The dried wood fibers thus obtained were then incubated with an enzyme solution according to EXAMPLE 1 (beginning activity of the enzyme approximately 1,000 U/ml) for a period of 48 hours. The incubated and dried wood fibers were then formed and compressed into a fiber mat and pressed into an MDF board. The pressing time was 5 minutes, the pressure was approximately 50 KP/m$^2$ and the temperature during pressing was approximately 180° C.

Table 2 shows the characteristics of the MDF fiber board thus obtained.

TABLE 2

| Measured Value | |
| --- | --- |
| Thickness (mm) | 5.39 |
| QZ (N/mm$^2$) | 0.46 |
| % swelling in 2 hrs | 19.16 |
| 24 hrs | 21.84 |
| Apparent density (kg/m$^2$) | 885 |

EXAMPLE 4 (comparison)

By comparison with example 3, defibrated wood fibers were dried to a residual dryness of 3.0% abs. dry at 130° C. The dried wood fibers thus obtained were then submerged in tap water for a period of 48 hours. The wood fibers were then de-watered and dried to a residual humidity. The dried wood fibers were then compressed into a fiber mat as described in Example 3 and into an MDF board. The pressing time was 5 minutes, pressure was approximately 50 KP/cm$^2$ and temperature during pressing approximately 180° C. No usable board was produced.

The activity of the enzyme solution was determined in each case as follows:

50 to 100 ml enzyme solution was added to 1 ml of 0.2 mM 2.6 dimethoxyhenol in McIlvaine buffer (0.1 ml citric acid+0.2 dipotassium hydrogen phosphate buffer).

Following an incubation period of 10 to 15 minutes at 37° C. the reaction is stopped with 1.0 mole DMSO (dimethyl sulfoxide) The evaluation is by photometric means at a wavelength of 468 nm and is compared with a standard.

EXAMPLE 5

Production of an MDF fiber plate in the dry process.

500 g defibrated fibers with a fiber humidity of approximately 50% were submerged into a peroxidase enzyme solution. A solution of peroxidase (E.C.1.11.1.7.) with an activity of 166 U/ml was used as the peroxidase enzyme solution. The temperature was 25° C., incubation time was 6 hours. During this time 30 ml of a H$_2$O$_2$ solution containing 15 mMol was added every 3 minutes.

Incubation tests were conducted at pH values of 4, 5 and 6.

After incubation, the material was dried in a centrifuge to approximately 100% residual humidity and then in a dryer to a residual humidity of 25% (abs. dry wood fiber). The dried material was strewn on a sieve, formed into a fiber mat, precompressed and pressed into a board at a pressure of 50 kp/cm$^2$. Pressing time was 6 minutes. The board obtained had a thickness of 5 mm.

After pressing the board was cooled.

The plates which were produced from material incubated at different pH values possessed the following characteristics:

| pH value of incubation | Apparent density (kg/m$^3$) | % Swelling/24th | Resistance to transversal traction (N/mm$^3$) |
| --- | --- | --- | --- |
| 4 | 900 | 27 | 0.75 |
| 5 | 900 | 18 | 0.72 |
| 6 | 1000 | 13 | 0.91 |

The values improve as pH values increase. Further increase of the pH value to 7 does not result in further improvement.

While the invention has been described by reference to specific embodiments, this was for purposes of illustration only. Numerous alternative embodiments will be apparent to those skilled in the art and are considered to be within the scope of the invention.

We claim:

1. A process for conglutinating wood fragments wherein said wood has middle lamella lignin, comprising incubating said wood fragments in an incubation mixture containing a phenol oxidizing enzyme thereby activating said middle lamella lignin.

2. The process of claim 1 further comprising incubating said wood fragments in said incubation mixture without chemical disintegration, removing water from said incubation mixture to achieve a residual humidity level of approximately 5–60% by weight, and forming said mixture into formed bodies by applying heat and/or pressure.

3. The process of claim 2 wherein said residual humidity level is about 8 to 28% by weight.

4. The process of claim 1 wherein said wood fragments are mechanically produced in a steam refiner or in a steam explosion process.

5. The process of claim 1 wherein said wood fragments are wood chips produced by mechanical comminution.

6. The process of claim 1 wherein said phenol oxidizing enzyme is dissolved in the solution and brought into contact with said wood fragments by spraying, or immersion.

7. The process of claim 1 wherein said phenol oxidizing enzyme is an oxidase.

8. The process of claim 1 wherein said phenol oxidizing enzyme is a polyphenol oxidase, a tyrosinase, or a peroxidase.

9. The process of claim 1 wherein said incubation mixture includes an auxiliary substance selected from the group consisting of an inducer, an emulsifying agent, an effector, or another enzyme.

10. The process of claim 1 wherein said wood fragments are incubated for at least two hours.

11. The process of claim 1 further comprising terminating said incubation by adding an enzyme inhibitor, denaturing said enzyme, or removing said enzyme.

12. The process of claim 1 further comprising partially removing water from said incubation mixture in a dry process until a residual humidity of 20% by weight or less is obtained.

13. The process of claim 1 further comprising partially removing water from said incubation mixture in a semi-dry process until a residual humidity of about 20–30% by weight is obtained.

14. The process of claim 1 further comprising partially removing water from said incubation mixture in a wet process until a residual humidity of up to about 120% by weight is obtained.

15. The process of claim 1 further comprising forming said wood fragments into formed bodies in a thermal process.

16. The process of claim 1 further comprising forming said mixture into a pre-compressed pre-product, and thereafter forming said pre-product into a desired form by applying pressure and/or heat without the presence of binders.

17. The process of claim 1 further comprising pressing said mixture in several steps.

* * * * *